July 3, 1956  A. MAREK  2,753,000
APPARATUS FOR CUTTING FILAMENTS AND THE LIKE
Filed Dec. 23, 1952
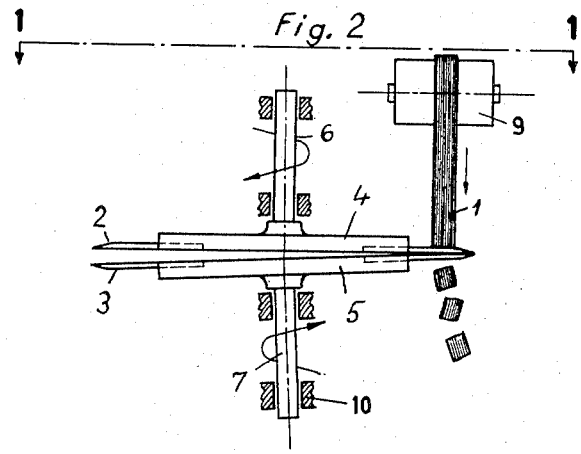
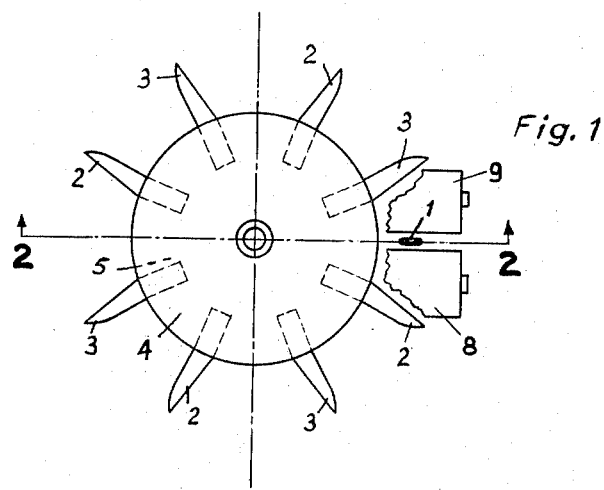
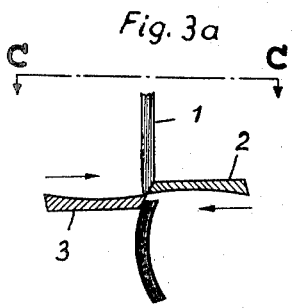 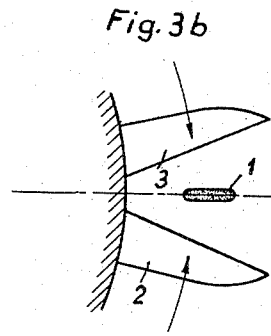 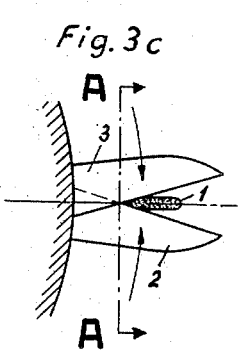
INVENTOR.
ANTON MAREK
BY

2,753,000

APPARATUS FOR CUTTING FILAMENTS AND THE LIKE

Anton Marek, Lenzing, Austria, assignor to Ing. A. Maurer S. A., Bern, Switzerland Application December 23, 1952, Serial No. 327,609

Claims priority, application Austria March 3, 1952

6 Claims. (Cl. 164—61)

The present invention relates to a cutting apparatus.

More particularly, the present invention relates to a cutting apparatus for cutting filaments or the like.

In certain textile arts, and in particular in the manufacture of artificial threads, it is necessary to lead filaments coming from a spinerette to a continually operating cutting machine to be cut thereby into sections of equal length. Many cutting devices are known for accomplishing these results, and in general the filaments to be cut are located beside each other and fed in a vertically downward direction to be cut by blades or the like located on a rotating horizontal disc. In order to avoid movement of the filaments to be cut from the vertical direction in which they are fed, and thereby guarantee that the filaments will be cut into sections of equal length, it is necessary with known machines to provide a means for clamping the filaments on both sides of the cutting plane since the filaments will otherwise be moved out of the vertical direction which would result in filament sections of unequal lengths. These known structures are quite complicated and present certain difficulties and inconveniences due to the fact that the filaments must be clamped before they are cut.

One of the objects of the present invention is to provide a cutting apparatus which is capable of cutting suspended filaments without tilting the same and without clamping the same on both sides of the cutting plane.

Another object of the present invention is to provide a cutting apparatus which is capable of continuously cutting downwardly moving filaments, which are not clamped beneath the cutting plane, into sections of uniform length.

A further object of the present invention is to provide a cutting apparatus which provides a scissors-like cutting action and is capable of cleanly and continuously cutting downwardly moving filaments into sections of uniform length without clamping the filaments beneath the cutting plane.

A still further object of the present invention is to provide a cutting apparatus of the above type which may be easily adjusted to change the lengths of the sections being cut.

Yet another object of the present invention is to provide a cutting apparatus capable of accomplishing all of the above objects while at the same time being made from very few, simple, ruggedly constructed parts.

With the above objects in view, the present invention mainly consists of an apparatus for cutting filaments and the like into uniform lengths, this apparatus including a support means on which a pair of elongated shafts are turnably mounted for rotation about their axis, respectively, these shafts being spaced from each other with an end portion of one shaft located adjacent and opposite to an end portion of the other shaft. A pair of identical discs are centrally fixed to these shaft end portions, respectively, and the discs respectively extend normal to the shaft axes so that the discs face each other. A plurality of blades are fixed to each of the discs, are evenly distributed about the same, and extend in a substantially radial direction from the periphery of the discs, these blades each having a cutting edge on one side thereof and the cutting edges of the blades fixed to one of the discs facing in an opposite direction from the cutting edges of the blades fixed to the other of the discs, so that when the shafts are rotated in opposite directions, respectively, the cutting edges on the blades of one disc and the cutting edges of the blades of the other disc cross over each other to cut filaments or the like located between the cutting edges with a scissors-like action.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a plan view of the structure of Fig. 2 taken along line 1—1 of Fig. 2 in the direction of the arrows;

Fig. 2 is an elevational, sectional view of the structure of Fig. 1 taken along line 2—2 of Fig. 1 in the direction of the arrows;

Fig. 3a is a diagrammatic sectional view taken along line A—A of Fig. 3c in the direction of the arrows and illustrating the operation of the structure of the present invention;

Fig. 3b is a diagrammatic, fragmentary view illustrating another position of the parts of the present invention during the operation thereof; and Fig. 3c is a fragmentary plan view taken along line C—C of Fig. 3a in the direction of the arrows.

Referring now to the drawings, which illustrate one possible embodiment of the present invention, it is seen that the apparatus of the present invention includes a support 10, diagrammatically illustrated, on which the shafts 6 and 7 are turnably mounted for rotation about their axis, these shafts being restrained against axial movement by suitable collars, or the like (not shown). As is apparent from Fig. 2, shaft 6 has a lower end portion located adjacent and opposite to an upper end portion of shaft 7, and a pair of discs 4 and 5 are respectively fixed, at their centers, to the shafts 6 and 7, these discs 4 and 5 being normal to the shaft axes, respectively.

A number of blades 2 are fixed to the disc 4, are located in a plane normal to the axis of shaft 6, and extend in a substantially radial direction from the periphery of the disc 4 by equal distances, as is apparent from Fig. 1, and the blades 2 are identical with each other and are arranged so that when the disc 4 turns in a clockwise direction, as viewed in Fig. 1, the cutting edge of each blade 2 is located on the leading side thereof. A number of blades 3, identical with the blades 2, are fixed to the disc 5, are located in a single plane normal to the axis of shaft 7, and extend in a substantially radial direction by equal distances from the disc 5, as is apparent from Fig. 1, the cutting edge of each blade 3 being located on the leading side thereof when the disc 5 is turned in counterclockwise direction, as viewed in Fig. 1.

As is apparent from Fig. 2, the axes of shafts 6 and 7 are slightly inclined with respect to each other so that they make an angle of almost 180° with each other, and the discs 4 and 5 are therefore also inclined with respect to each other. Also the plane in which the blades 2 are located is inclined with respect to the plane in which the blades 3 are located, these planes intersecting each other along a line located on the right hand side of discs 4 and 5, as viewed in Figs. 1 and 2, this line being located between the peripheries of discs 4 and 5 and the outer ends of the blades.

Any suitable drive means, such as motors, gearing, and the like (not shown), is operatively connected to the shafts 6 and 7 for respectively rotating the same in opposite directions, as shown by the arrows of Fig. 2, and in this way successive blades 2 respectively cross over successive blades 3 to cooperate with the same to cut the filaments 1 moving downwardly, as viewed in Fig. 2, along a vertical line located between the approaching cutting edges of the blades, the latter providing a scissors-like action for cutting the filaments 1. Due to the inclination of the planes in which the blades 2 and 3 are respectively located, each successive blade 2 respectively engages the successive blade 3 in such a way that these blades mutually press each other to tend to become located in a substantially horizontal plane, so as to guarantee a clean cutting action.

It is to be understood that, although the drawings illustrate the blades 2 and 3 as respectively being located in planes which are inclined with respect to each other, it is within the purview of the present invention to arrange the blades in parallel planes which are located close to each other.

A pair of rollers 8 and 9 are located over the blades 2 and 3 on the side of discs 4 and 5 where these blades contact each other to feed the filaments 1 thereto.

Any suitable adjusting means may be provided to vary the speed of rotation of one or both shafts 6 and 7 and of the rollers 8 and 9 to very easily adjust the length of the sections into which the filaments are cut. Although any suitable number of blades 2 and 3 may be located on the discs 4 and 5, respectively, it is preferred to provide four blades 2 and four blades 3 on these discs, the blades 2 and 3 each being located 90° apart from each other, because this arrangement lends itself to a wide variety of adjustments enabling the apparatus to vary the lengths of the filament sections considerably.

Fig. 3b shows a blade 2 and a blade 3 approaching each other in the direction of the arrows of Fig. 3b to cut the filaments 1 located between these blades. In Fig. 3c the blades of Fig. 3b are shown in the position where they have already started to cross over each other and cut the filaments 1, and Fig. 3a clearly illustrates the scissors-like cutting action provided by the cooperation of the blades 2 and 3 moving in opposite directions, as shown by the arrows of Figs. 3a and 3c.

It will be understood that each of the elements described above, or two or more together, may also find a useful application in other types of apparatus for cutting filaments, or the like, differing from the types described above.

While the invention has been illustrated and described as embodied in apparatus for continuously cutting filaments, or the like, into sections of uniform length, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for cutting filaments, and the like, into uniform lengths, said apparatus comprising, in combination, support means; a pair of elongated shafts turnably mounted on said support means, for rotation about their axes, respectively, said shafts being spaced from each other with an end portion of one shaft located adjacent and opposite to an end portion of the other shaft, and said shafts being slightly inclined with respect to each other and said shaft axes making an angle of almost 180° with each other; a pair of identical discs centrally fixed to said end portions of said shafts, respectively, and respectively extending transversely to said shaft axes so that said discs face each other; and a plurality of blades fixed to each disc, being evenly distributed about the same, and extending in a substantially radial direction from the periphery thereof, said blades each having a cutting edge on one side thereof and the cutting edges on the blades fixed to one of said discs facing in an opposite direction from the cutting edges of the blades fixed to the other of said discs, so that when said shafts are rotated in opposite directions, respectively, the cutting edges of the blades on said one disc and the cutting edges of the blades on said other disc cross over each other to cut filaments, or the like, located between said cutting edges, the blades on said one disc being located in a first plane and the blades on said other disc being located in a second plane inclined to said first plane and intersecting the same on one side of said discs and along a line located between the peripheries of said discs and the outer ends of said blades so that the latter contact each other upon rotation of said discs in opposite directions, respectively, to provide a scissors action; and a pair of rollers located over said blades on said one side of said disc for feeding filaments to be cut to said blades.

2. A process for cutting elongated filaments, and the like, into portions of uniform length comprising the steps of feeding the threads to be cut at a uniform rate along a predetermined path; and rotating adjacent sets of knife blades about respective axes slightly inclined to each other for moving the sets of knife blades across each other and across said path at regular intervals and in planes substantially normal to said path so that said filaments will be cut into uniform lengths by said blades.

3. Apparatus for cutting filaments, and the like, into uniform lengths, said apparatus comprising, in combination, a first cutting means having a plurality of spaced blades extending therefrom; a second cutting means having a plurality of spaced blades extending therefrom, said second cutting means being located directly opposite said first cutting means; first turning means operatively connected to said first cutting means to turn the same in one direction of rotation; and second turning means operatively connected to said second cutting means to turn the same in a direction opposite to said one direction of rotation, the axes of turning of said first and second turning means being slightly inclined relative to each other, so that said blades cross over each other to cut filaments, or the like, with a scissors-like cutting action.

4. Apparatus for cutting filaments, and the like, into uniform lengths, said apparatus comprising, in combination, a first cutting means having a plurality of spaced blades extending therefrom; a second cutting means identical with said first cutting means and being located opposite to and facing the same; first turning means operatively connected to said first cutting means to turn the same in one direction of rotation; and second turning means operatively connected to said second cutting means to turn the same in a direction opposite to said one direction of rotation, the axes of turning of said first and second turning means being slightly inclined relative to each other, so that said blades cross over each other to cut filaments, or the like, with a scissors-like cutting action.

5. Apparatus for cutting filaments, and the like, into uniform lengths, said apparatus comprising, in combination, a first cutting means having a disc and a plurality of spaced blades extending substantially radially therefrom at the periphery thereof and all having a cutting edge on the leading side thereof when said disc is turned in one direction of rotation; a second cutting means identical with said first cutting means and being located opposite to and facing the same so that the blades of said second cutting means all have a cutting edge on the leading side thereof when said second cutting means is rotated in a direction opposite to said one direction of rotation; first turning means operatively connected to said disc of said first cutting means to turn the same in said one direction of rotation; and second turning means operatively connected to said second cutting means to turn the same in said opposite direction of rotation, the axes of turning of said first and second turning means being slightly inclined relative to each other.

6. Apparatus for cutting filaments, and the like, into uniform lengths, said apparatus comprising, in combination, support means; a pair of elongated shafts turnably mounted on said support means, for rotation about their axes, respectively, said shafts being spaced from each other with an end portion of one shaft located adjacent and opposite to an end portion of the other shaft, the axes of said shafts being slightly inclined relative to each other; a pair of identical discs centrally fixed to said end portions of said shafts, respectively, and respectively extending transversely to said shaft axes so that said discs face each other; and four blades fixed to each of said discs, being located 90° apart from each other, extending in a substantially radial direction from the periphery of said discs by equal distances, and being located in a single plane, said blades each having a cutting edge on one side thereof and the cutting edges on the blades fixed to one of said discs facing in an opposite direction from the cutting edges of the blades fixed to the other of said discs, so that when said shafts are rotated in opposite directions, respectively, the cutting edges of the blades on said one disc and the cutting edges of the blades on said other disc cross over each in contact with one another to cut filaments, or the like, located between said cutting edges, said blades being bendable out of this respective planes so as to be approximately parallel to each other during contact thereof.

References Cited in the file of this patent

UNITED STATES PATENTS

| | | |
|---|---|---|
| 119,181 | Roberts | Sept. 19, 1871 |
| 340,420 | Coldwell | Apr. 20, 1886 |
| 1,414,239 | Warren | Apr. 25, 1922 |
| 1,651,654 | Williams | Dec. 6, 1927 |
| 1,764,202 | Drefuss | June 17, 1930 |
| 1,884,377 | Temple | Oct. 25, 1932 |
| 1,895,246 | Hale et al. | Jan. 24, 1933 |
| 2,010,078 | Hale | Aug. 6, 1935 |
| 2,173,789 | Nickles et al. | Sept. 19, 1939 |
| 2,205,036 | Hamel | June 18, 1940 |
| 2,277,753 | Furness | Mar. 31, 1942 |